Dec. 12, 1967
F. A. SMITH
3,357,916
CATALYTIC REACTOR FOR THE CONVERSION OF HYDROCARBONS
EMPLOYING HIGH SPACE VELOCITIES
Filed June 25, 1965
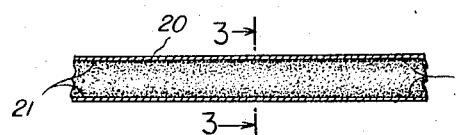
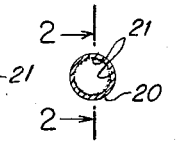
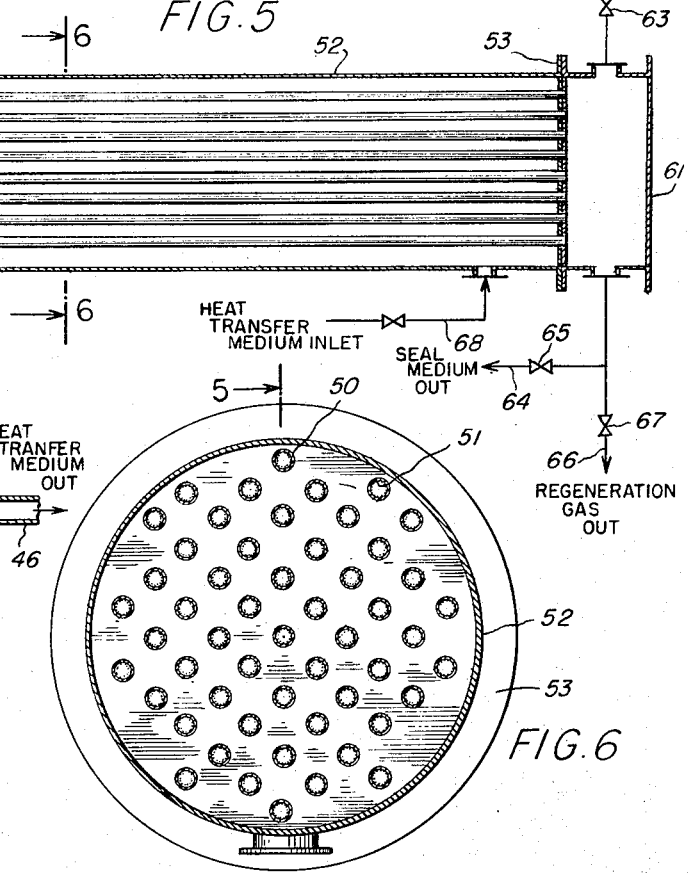
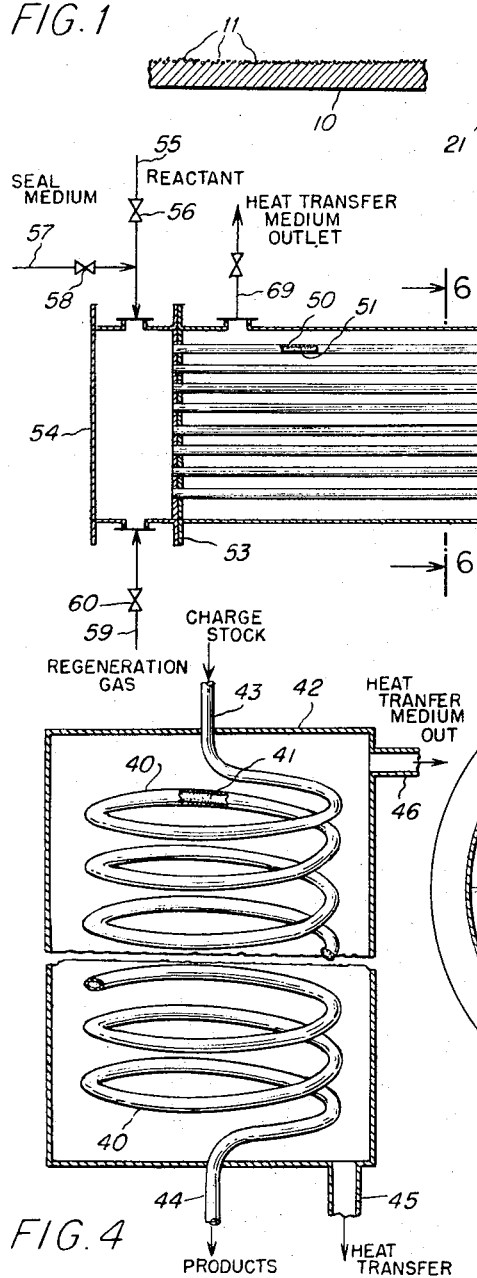
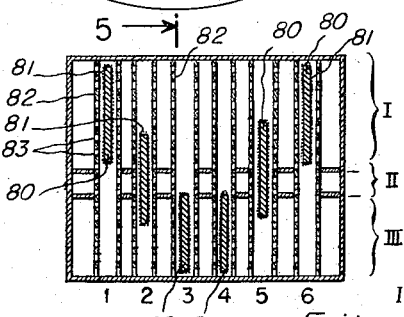
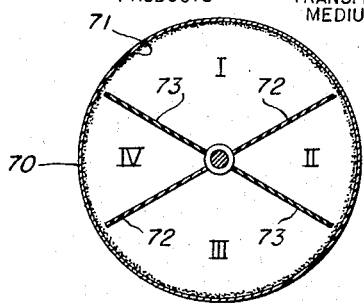
INVENTOR.
Fritz A. Smith

3,357,916
CATALYTIC REACTOR FOR THE CONVERSION OF HYDROCARBONS EMPLOYING HIGH SPACE VELOCITIES
Fritz A. Smith, Cherry Hill, N.J., assignor to Mobil Oil Corporation, a corporation of New York
Filed June 25, 1965, Ser. No. 467,045
9 Claims. (Cl. 208—120)

The present invention relates to a novel and highly efficient reactor for chemical conversion. More particularly, the invention relates to a novel reactor design utilizing advantageously high activity catalysts in chemical conversion processes, such as catalytic cracking, hydrocracking, reforming, alkylation, hydrocyclization, dehydrogenation, isomerization, disproportionation, and the like.

The present invention is directed to a novel reactor which can utilize fully the activity of super active catalysts, which are too active to be fully utilized in conventional reactors. In its preferred embodiments the present reactors find ideal utilization in catalytic conversion processes in the presence of a new class of highly crystalline aluminosilicates.

Conventional reactor schemes comprise fixed-bed, moving-bed and fluidized-bed conversion processes. In catalytic cracking of hydrocarbons, for example, a silica-alumina cracking catalyst has been found highly effective in moving-bed and fluidized-bed catalytic crackers. Such catalysts have found wide commercial application.

While it is true that a number of conventional catalysts and techniques have been found to be generally satisfactory, as evidenced by wide industrial acceptance and use of catalytic processes in the petroleum and other industries, research has continued for the purpose of developing new and improved catalytic compositions, as well as methods of manufacturing and using the improved catalysts. As a result of these continued efforts, a new class of superior catalysts has been discovered.

The catalysts in question have been found to have extraordinary activities, especially for the conversion of hydrocarbons by moving-bed, fluidized-bed and other catalytic processes. In fact, the relative activity of these catalysts is so astonishing that early experiments were discouraging due to the rapid build-up of a carbonaceous deposit on the surface of the catalyst. Only after considerable investigation was it learned that the catalysts actually possessed excellent conversion activity. Attention was then directed to methods for improving such catalysts to permit their efficient use in current and future catalytic methods and apparatus.

As a result of further research, it has been found that the activity of such catalysts can be controlled so that they may be used efficiently in conventional cracking processes. It has also been found that the new and improved catalysts can be employed to raise the efficiency of standard cracking processes. Each means of controlling the super active catalysts, however, has involved in effect reducing the activity of the catalysts to a level which would be suitable for conventional reactors.

Thus, the super active catalysts may be treated with steam or other compounds to reduce their activity. Or the catalysts may be diluted by incorporation in a matrix of lower or minimal activity, or used in a physical particle-form mixture with low-activity components. In each case, the super active catalysts are in effect deactivated or diluted for use in conventional reactors. None of the present schemes, however, utilize fully the super active catalysts; much of the catalyst activity potential is lost by present methods.

In spite of an incomplete utilization of activity, the use of super active catalysts in conventional reactors has been nearly revolutionary. Thus, high conversion and selectivity at high space velocities have been realized at great savings. It is understandable that, in the light of great savings effected with super active catalysts harnessed to utilize only partial activity, the industry is reluctant to utilize full activity which would make obsolete conventional systems worth many millions of dollars.

It is, therefore, a major object of the present invention to provide a high space velocity reactor scheme capable of utilizing fully super active catalysts, such as crystalline aluminosilicate cracking catalysts. It is a further object to provide such a reactor capable of economic installation and integration in present commercial processes. Other objects and advantages of the present invention will become apparent to those skilled in the art from the following detailed description and drawings.

The above objectives to utilize fully super active catalysts notwithstanding, at times some deactivation is desired for the present method due to an improvement in catalyst selectivity resulting consequently from such deactivation. Thus, although some deactivation of the super active catalyst may be desirable, the catalysts of the present system even when deactivated are nevertheless substantially more active than conventional catalysts.

In one embodiment the present invention comprises a novel catalytic reactor having catalyst walls of a super active catalyst embedded on the surface of heat conductive material. The catalytic reaction takes place at the surface of said walls in the presence of the embedded super active catalyst. Preferably, the catalyst walls are thin, of a thickness less than about ½ inch. If the catalyst wall thickness is high, substantially greater than 1 inch, diffusion limitations result and catalyst selectivity is deleteriously affected.

In a preferred embodiment the reactor of the present invention comprises a parallel series, or a single helical, heat-conductive tube with a highly active crystalline aluminosilicate catalyst embedded in the inner surface thereof, and in which tubes the catalytic reaction proceeds at high space velocity with the reactants in a turbulent state. Preferably, a heat conductive medium, such as steam or cooling water, may be provided external to said reactor tubes to provide endothermic or to remove exothermic heat of reaction. The heat conductive medium may supply or remove heat by exothermic or endothermic reaction; for example, methane may be burned at external surfaces to supply heat to an endothermic reaction taking place at the internal catalyst wall.

In an alternative embodiment, the present invention comprises a series of heat-conductive tubes with the highly active crystalline aluminosilicate catalyst particles embedded on the outer surface thereof and having a heat conductive medium on the inside.

In a preferred embodiment, the present invention comprises one or a series of heat-conductive helical tubes with a super active catalyst wall on the internal surfaces thereof and having a heat conductive medium on the external surfaces.

Thus, in a simplified embodiment the present invention resembles a shell-and-tube heat exchanger with a highly active crystalline aluminosilicate catalyst embedded on the tube surfaces: either on the inner surface with a heat conductive medium on the shell side, or on the outer surface with a heat conductive medium on the tube side.

Alternatively, it is possible to have catalyst walls at both the internal and external surfaces, one or both catalysts being super active. One catalyst wall would enhance the primary reaction, while the opposite wall would catalyze a reaction to balance overall heat requirements.

In another embodiment the present invention comprises a reactor having sheets of material, the surfaces of which are embedded with a super active catalyst such as the highly active crystalline aluminosilicates. The reactant materials pass the catalyst-embedded surfaces at high space velocity in a turbulent state and the reaction proceeds at the surface thereof.

As mentioned above and in more detail hereinafter, the catalysts utilized herein are extremely active, having activities many times higher than those of conventional catalysts. Notably, the highly active crystalline aluminosilicates exhibit activity indices of from 10 to greater than 10,000 times greater than conventional silica-alumina cracking catalysts and additionally, in a highly selective form, can exhibit low aging rates. In preferred embodiments, however, provision is made for regeneration of the aged catalyst material in the reactors of the present invention.

The crystalline aluminosilicate catalyst embedded on heat exchange surfaces in the reactors of the present invention may be either natural or synthetic zeolites. Representative of particularly preferred zeolites are zeolite X, zeolite Y, zeolite L, faujasite, offretite, chabazite and mordenite. Synthetic zeolites have been generally described by Barrer in several publications and in U.S. Patent 2,306,610 and U.S. Patent 2,413,134. These materials are essentially the dehydrated forms of crystalline hydrous siliceous zeolites containing various quantities of alkali metals. The alkali metal atoms, silicon, aluminum and oxygen in these zeolites are arranged in the form of an aluminosilicate salt in a definite and consistent crystalline pattern. The structure generally contains a large number of small cavities, interconnected by a number of still smaller holes or channels. These cavities and channels are precisely uniform in size. The alkali metal aluminosilicate used in preparation of the present catalyst has a uniform pore structure comprising openings characterized by an effective pore diameter generally between 3 and 15 Angstrom units.

Suitable natural and synthetic zeolites or crystalline aluminosilicates are listed extensively and described in U.S. Patents 3,140,249 and 3,140,251. Patents directed to specific synthetic zeolites suitable for the present invention include U.S. Patents 2,958,579 (Zeolite A); 3,008,863 (Zeolite B); 2,962,355 (Zeolite E); 2,996,358 (Zeolite F); 3,010,789 (Zeolite H); 3,011,869 (Zeolite J); 3,056,654 (Zeolite K–G); 2,995,423 (Zeolite M); 2,991,151 (Zeolite Q); 3,030,181 (Zeolite R); 3,054,657 (Zeolite S); 2,950,-952 (Zeolite T); 3,012,853 (Zeolite W); 2,882,244 (Zeolite X); 3,130,007 (Zeolite Y); and 2,972,516 (Zeolite Z). Foreign patents have been issued for Zeolite D (German 1,099,511) and Zeolite L (German 1,110,009).

Perhaps the most important commercial application of crystalline aluminosilicate catalysts is in the field of hydrocarbon conversion, particularly catalytic cracking of petroleum stocks to increase the yield of gasoline and other desired products from crude petroleum, see U.S. Patents 3,140,249 and 3,140,253. In the catalytic cracking of hydrocarbons certain active crystalline aluminosilicates have demonstrated activities of greater than 10,000 times that of conventional commercial catalysts presently in use, such as silica-alumina.

In order to measure catalytic activity over such a wide range, a novel test has been devised. The span of activities among the catalysts investigated by the following test is so large that comparison tests of cracking at any standard temperature would result in either conversion too low for analytical determination at one end of the scale, or so close to complete conversion at the other end that no useful measure is attainable. Thus, it was found necessary to crack over relatively inactive catalysts, e.g., a standard silica-alumina cracking catalyst, at relatively high temperatures, and to crack over superactive crystalline aluminosilicate catalysts at relatively low temperatures, in order to effect reasonable conversion. It was found that the relationship between the reaction rate constant for the catalytic cracking of n-hexane, was capable of presentation in a straight line relationship with conversion temperature, assuming a first order reaction. Accordingly, similarities have been found in the slopes of Arrhenius plots (apparent activation energies) of activity among various catalytic compositions, including silica-alumina and various superactive crystalline aluminosilicates. Consequently, it appears justifiable to compare relative activity magnitudes by extrapolation to a standard temperature chosen to be 1000° F. The apparatus employed includes a micro reactor containing 1.5 cc. of the test catalyst in particles of a size in the range of 12–28 mesh or less. By the use of heating elements and temperature measuring devices, it was possible to maintain the reactor bed at substantially constant conversion temperature. A stream of n-hexane in helium at 25° C. was heated to conversion temperature and concurrently passed over the catalyst with a 9-second superficial contact time (superficial catalyst volume/gaseous volume flow rate). A sample was collected 5 minutes after reaction commencement and analyzed to determine the fraction of n-hexane cracked to lower boiling hydrocarbons and other products. Conversion temperatures were chosen for accuracy of measurement so that conversion generally was in the range of 5–40 percent.

Conversion may be measured at a specific conversion temperature according to the following relationship:

$$k \sim (1/\tau) \log \frac{1}{1-\epsilon}$$

where $k$ is the reaction rate constant, $\epsilon$ is conversion and $\tau$ is residence time.

A relative rate constant for a particular catalyst composition is defined by:

$$k/k°_{SiAl} = \frac{\tau_{SiAl}}{\tau} \frac{\log \frac{1}{1-\epsilon}}{\log \frac{1}{1-\epsilon°_{SiAl}}}$$

wherein $k/k°_{SiAl}$ is the rate constant relative to a standard silica-alumina cracking catalyst for conversion at 1000° F., $k°_{SiAl}$ being the rate constant for the standard silica-alumina catalyst, $\epsilon°_{SiAl}$ is the conversion for the standard catalyst at 1000° F., and $\tau_{SiAl}$ is the residence time for conversion over the standard catalyst.

It was observed that the relationship of relative activity, $k/k°_{SiAl}$, on a logarithmic ordinate with the inverse of the absolute temperature of conversion on a proportional abscissa was substantially a straight line function. Thus, the activity for a particular component was determined by finding the relative activity for a plurality of temperatures and extrapolating to 1000° F. the above straight-line relationship between relative activity and inverse temperature.

The values for relative activity extrapolated for test catalyst compositions to 1000° F. are hereinafter denominated by the term alpha ($\alpha$). Thus, alpha ($\alpha$) represents the activity of the test catalyst relative to a standard sample of silica-alumina. Accordingly the rate constant alpha ($\alpha$) is relative to the rate constant of a highly active conventional amorphous silica-alumina cracking catalyst obtained by cogelation [see Alexander, J., Proceedings Amer. Pet. Inst., 27 (III), 51 (Nov. 1947)], containing 10 percent by weight alumina and having a surface area of 420 square meters per gram. The standard catalyst has a petroleum gas oil cracking activity substantially in excess of that of contemporary commercial cracking catalysts; its activity, according to an industrially accepted test method is about 46 AI [see Chem. and Met. Eng. 53, 94–98, 138–141 (April 1946)]. The standard catalyst converts by cracking 12.5 percent of n-hexane in a stream of helium, the catalyst being at 1000° F., after 5 minutes of the 9-second superficial contact time.

According to the above test, crystalline aluminosilicate components were found to have alphas in the range of between about 0.5 to substantially greater than 10,000. Conventional cracking catalysts and other amorphous materials exhibited alphas generally in the range of about 0.1 to 2.0.

The catalysts of the present invention are characterized by exceptional catalytic activity, herein defined as super active catalysts. Super active catalysts are characterized by an activity substantially greater than conventional catalysts. Thus, "super active catalyst" is a term relative to its context, and varies absolutely depending upon the particular employment of the crystalline aluminosilicate, that is, in catalytic cracking, reforming, oxidation, hydrogenation or the like. Generally, a super active catalyst is characterized by an alpha ($\alpha$) greater than 1 (although catalysts of a lower alpha ($\alpha$) as defined may be super active in certain employment). Thus the alpha test best measures acid or cracking activity, and catalysts super active for other catalytic functions may have a relatively low alpha ($\alpha$). Yet, such super active catalysts are within the scope of the present invention. For employment in catalytic cracking, the super active catalysts are characterized by an alpha ($\alpha$) greater than 2, and preferably greater than 10.

This high catalytic activity may be imparted to the crystalline aluminosilicate by base exchanging alkali metal aluminosilicate particles—either before or after dispersion thereof in a suitable matrix—with a base-exchange solution containing ions selected from the group consisting of cations of elements of Groups IB–VIII of the Periodic Table, hydrogen and hydrogen precursors; including mixtures thereof with one another. Hydrogen precursors, such as ammonia and ammonium salts, typically undergo, upon heating, degradation to hydrogen cations in contact with aluminosilicates. Suitable methods of base exchange are described in the aforenoted U.S. Patents 3,140,249 and 3,140,253. Preferably, the crystalline aluminosilicate component for hydrocarbon conversion application is characterized by an alpha ($\alpha$) greater than 2 up to values even greater than 10,000.

Alpha values for certain crystalline aluminosilicates have been determined according to the test procedure described hereinabove. It should be realized that any single composition may exhibit widely varying activities, depending primarily upon method of preparation, exchange cations or the like. Thus, the values presented below are typical single measurements of the activity, representative for each aluminosilicate component.

CRYSTALLINE ALUMINOSILICATE

| Synthetic: | Alpha ($\alpha$) |
|---|---|
| Sodium X | 1 |
| Rare Earth X [1] | >10,000 |
| Magnesium X [1] | 1.2 |
| Platinum X [2] | 5 |
| Nydrogen X [1] | 50 |
| Zinc X [1] | 12 |
| CoMo rare earth X [3] | 20 |
| Rare earth hydrogen X [1] | >10,000 |
| Titanium hydrogen Y [1] | 5,000 |
| Titanium Y [1] | 0.7 |
| Iron hydrogen Y [1] | >10,000 |
| Hydrogen Y [1] | 5,000 |
| Rare earth hydrogen Y [1] | 7,000 |
| Calcium A [1] | 0.4 |
| Sodium A | 0.1 |
| Rare earth A [1] | 10 |
| Calcium T [1] | 0.4 |
| Calcium S [1] | 0.4 |
| Hydrogen S [1] | >10,000 |
| Hydrogen T [1] | >10,000 |
| Hydrogen L [1] | 300 |

[1] Base exchanged sodium zeolite X, Y, etc.
[2] Impregnated sodium zeolite X, etc.
[3] Rare earth base-exchanged, sodium zeolite X impregnated with cobalt oxide, and molybdena.

| Natural materials: | |
|---|---|
| Natural crystalline aluminosilicates generally | 0.1–1.1 |
| Hydrogen mordenite [4] | >10,000 |
| Rare earth chabazite [5] | 10 |
| Hydrogen chabazite [4] | >10,000 |
| Hydrogen gmelinite [4] | >10,000 |
| Hydrogen offretite [4] | >10,000 |

[4] Base exchanged with hydrogen or hydrogen precursor ions.
[5] Base exchanged with rare earth ions.

From the above lists, it can be seen that natural and synthetic zeolites or crystalline aluminosilicates possess varying activities for n-hexane cracking, some species being more than 10,000 times as active as a high activity silica-alumina. For hydrocarbon conversion processes, preferably the crystalline aluminosilicate component (in the form existing in the final composite) is characterized by an alpha ($\alpha$) greater than 2.

In order to achieve super active catalytic activity a crystalline alkali metal aluminosilicate is base-exchanged, as above described, preferably with a solution containing ions selected from the group consisting of rare earth metals, calcium, manganese, magnesium, hydrogen, hydrogen precursors and mixtures thereof with one another. It should be understood that the crystalline aluminosilicate employed is generally an alkali metal aluminosilicate, but other forms, such as an alkaline earth metal aluminosilicate, are also suitable. The following discussion, however, will assume the use of an alkali metal aluminosilicate.

After base-exchange treatment, the product is removed from the treating solution. Anions introduced as a result of treatment with the base-exchange solution may be removed, if desired or necessary, by water-washing the treated composite until the same is free of said anions. The washed product is then dried, generally in air, to remove substantially all of the water therefrom. While drying may be effected at ambient temperature, it is more satisfactory to facilitate the removal of moisture by maintain the product at a temperature between about 150 and about 600° F. for 4 to 48 hours.

The dried material may, if desired, then be subjected to calcination by heating in an inert atmosphere, i.e., one which does not adversely affect the catalyst, such as air, nitrogen, hydrogen, flue gas, helium or other inert gas. Generally, the dried material is heated in air to a temperature in the approximate range of 500° F. to 1500° F. for a period of at least about 1 hour and usually between 1 and 48 hours.

The above-described base-exchanged crystalline alumino-silicate catalysts exhibit an extraordinarily high activity for catalytic conversion of compounds convertible in the presence of acidic catalyst sites. It is within the scope of the present invention to incorporate within the crystal structure of the crystalline aluminosilicate, for example, by impregnation, additional catalytic components in order to broaden the range of utility of the highly active catalysts. Similarly, the crystalline aluminosilicate may be base-exchanged with ions exhibiting independent catalytic activity for use in a wide variety of catalytic operations.

Thus, the highly active base-exchanged crystalline aluminosilicate may be impregnated or base exchanged with a hydrogenation component to render the catalyst highly active for such processes as hydrocracking, reforming, hydrocyclization, hydrogenation, dehydrogenation, disproportionation, isomerization and the like. Suitable hydrogenation components include one or more of the metals of Groups V, VI and VIII of the Periodic Table either in elemental or ionic form or in the form of the oxides or sulfides. Representative of these metals are arsenic, antimony, bismuth, molybdenum, chromium, tungsten, iron, cobalt, nickel, and metals of the platinum group, i.e. platinum, palladium, osmium, rhodium, ruthenium and iridium, as well as combinations of these metals, their oxides or sulfides. Thus, a particularly desirable combination of metal oxides is that of the oxides of cobalt and molybdenum intimately combined with the above-described crystalline aluminosilicate by impregnation.

Combination of one or more of the above-indicated hydrogenation components with the crystalline aluminosilicate may take place in any feasible manner, for example, by impregnating the aluminosilicate with solutions containing ions of the appropriate hydrogenation component. In this manner, a hydrogenation component can be introduced by deposition of the incoming metal on the exchanged crystalline aluminosilicate, after removal of the impregnating solution from the crystalline aluminosilicate carrier. Other means for combining the exchanged crystalline aluminosilicate with the hydrogenation component are feasible such as for example, the addition of the hydrogenation component to a slurry of the aluminosilicate.

Additional catalystic components may be added. For example, nickel or nickel compounds may be added to promote hydrocracking, desulfurization and dehydrogenation; cobalt or cobalt compounds may be added to promote reactions such as dealkylation; platinum may be added to promote reactions such as reforming and hydrocracking; and tellurium or selenium compounds may be added to promote reactions such as dehydrocyclization.

The principles and advantages of the present invention will be more fully understood by a consideration of preferred and alternative embodiments shown in the attached drawings, wherein:

FIGURE 1 is a detailed cross-sectional view of a highly active catalyst embedded on the surface of a heat conductive material.

FIGURE 2 is a longitudinal cross-sectional view of a heat conductive tube, the inner surface of which is embedded with a super active catalyst.

FIGURE 3 is an axial cross-sectional view of the tube illustrated in FIGURE 2.

FIGURE 4 is a schematic cross-sectional view of a reactor shell comprising a helical tube, the inner surfaces of which is embedded with a super active catalyst.

FIGURE 5 is a longitudinal cross-sectional view of a shell-and-tube reactor comprising tubes, the inner surfaces of which are embedded with a super active catalyst.

FIGURE 6 is an axial cross-sectional view of the shell-and-tube reactor illustrated in FIGURE 5.

FIGURE 7 is an axial cross-sectional view of a super-active catalyst reactor providing continuous reaction-regeneration operation by means of rotating zones.

FIGURE 8 is an axial cross-sectional view of a reactor provided with super active catalyst surfaces movable between reaction and regeneration zones.

Referring now to FIGURE 1, there is shown a heat conductive material 10, the surface of which is embedded with super active catalyst particles 11. Similarly, FIGURES 2 and 3 illustrate a heat conductive tube 20 embedded with super active catalyst particles 21 on the inner surface thereof. Super active catalyst may be introduced by precipitation from a liquid or by mechanical embedment in the walls of a porous tube material such as refractory Alundum. Other tube materials formed in tubes may be acid etched and embedded with super active particles or powder, packed into the etched pores. Alternatively, thin layers of super active catalytic material may be held in place mechanically with screens.

Referring to FIGURE 4, there is shown a schematic drawing of a preferred embodiment of the present invention: a reactor shell containing a length of helical tubing having embedded on the inner tube surface a super active catalyst and having means for passage of a heat transfer medium on the shell side. As shown in FIGURE 4, the preferred helical tube reactor comprises helical tube 40 embedded with super active catalyst particles 41 and retained within shell 42. The reactor is provided with a reactant inlet line 43 and a product outlet line 44. Provision is made for a cooling or heating, heat transfer medium on the shell side by heat transfer medium inlet 45 and outlet 46.

In a typical application of the reactor illustrated in FIGURE 4, a hydrocarbon charge stock is passed over super active catalyst particles, for example, rare earth and acid exchanged synthetic Y faujasite. Such crystalline aluminosilicate is characterized by an alpha ($\alpha$) of greater than 1000. In the reactor the conditions are as follows: temperature about 1000° F.; pressure, about 1 atmosphere; tube length, 410 feet; liquid hourly space velocity, about 170. The design of the reactor illustrated in FIGURE 4 makes possible the high space velocities of a charge stock in turbulent flow which allows substantial utilization of the super active crystalline aluminosilicate catalyst.

Referring again to FIGURE 4, during cracking operation, a hydrocarbon charge stock at a temperature of about 1000° F. enters inlet 43. The charge passes in turbulent flow through helical tube 40 and is cracked in the presence of catalyst particles 41. The cracked product stream passes out of the reactor through outlet 44. In order to provide endothermic heat of cracking methane is combusted on the shell side of reactor tube 40 within shell 42. Thus, methane and oxygen-containing gas enter the reactor through heat transfer medium inlet 45 and combustion gases exit via heat transfer medium outlet 46.

Referring now to FIGURES 5 and 6, there is shown a preferred embodiment of the present invention: a shell-and-tube reactor having embedded on the inner tube surfaces a super active catalyst and having means for passage of a heat transfer medium on the shell side. The preferred reactor has provision for periodic regeneration of the embedded catalyst.

As shown in FIGURES 5 and 6 the preferred reactor comprises tubes 50 embedded with catalyst particles 51, retained fixed in shell by end tube sheets 53. The reactor is provided with an inlet header 54, reactant inlet line 55 and valve 56, seal medium inlet line 57 and valve 58 and regeneration gas inlet 59 and valve 60; outlet header 61, product outlet line 62 and valve 63, seal medium outlet line 64 and valve 65 and regeneration gas outlet line 66 and valve 67. Provision is made for a cooling or heating, heat transfer medium on the shell side by heat medium inlet 68 and outlet 69.

A typical application of the reactor illustrated in FIGURES 5 and 6 is the cracking of a hydrocarbon stock over a rare earth exchanged synthetic X faujasite. Such crystalline aluminosilicate is super active, characterized by an alpha ($\alpha$) of 1000, i.e., having an activity about 1000 times that of a conventional silica-alumina cracking catalyst. In the reactor the conditions are as follows: temperature, about 1000° F., pressure, about 1 atmosphere; liquid hourly space velocity, about 450. The design of the reactor illustrated in FIGURES 5 and 6 makes possible the high space velocities which allow full utilization of the highly active rare earth X aluminosilicate.

Referring now to FIGURES 5 and 6 during cracking operation a hydrocarbon charge stock, at conversion temperature of about 1000° F., enters inlet header 54 through line 55 and valve 56. The charge passes in turbulent flow through tubes 50 and is cracked in the presence of catalyst particles 51. The product stream passes into outlet header 61 and leaves the reactor by outlet line 62 through valve 63. A super-heated-steam heating medium provides the energy required to crack the charge stock and enters the reactor shell side through inlet 68, passes countercurrent on the shell side of tubes 50 and leaves the reactor through outlet 69.

After a period of use, the super active catalyst particles may become deactivated in part by the deposition of a coke-like product of the reaction. Suitably, periodic regeneration of the catalyst by burning the coke-like material may be required. Regeneration of the super active catalyst is accomplished in three steps: purging the reaction gases and products from the reactor, regenerating the catalyst with an oxidizing gas and purging the regeneration gas from the reactor.

Referring again to FIGURES 5 and 6, after the reactant valve 56 and product valve 62 are closed, seal medium inlet valve 58 and outlet valve 65 are opened to allow a suitable seal medium, such as steam, to purge the reactor of reactant and product. The seal medium enters inlet line 57 and header 54 through tubes 50 and exits via outlet header 61 and line 64. After the reactant and product gases are purged, seal medium valves 58 and 65 are closed and regeneration gas inlet valve 60 and outlet valve 67 are opened. A suitable regeneration gas, such as heated air, is passed through tubes 50 to burn the coke-like deposits from the catalyst particles 61, thereby regenerating the super active catalyst. Flue gas passes through outlet header 61 and line 66 as the regeneration product. Again, the system is purged of oxidizing gases with a suitable seal medium prior to charging the reactor with the hydrocarbon charge stock. If desired, a heat transfer medium, such as steam, may be passed on shell side through inlet line 68 and outlet line 69 during regeneration to remove part of the heat thereby produced.

FIGURES 7 and 8 illustrate alternative embodiments employing the method of the present invention in a novel reactor scheme. In FIGURE 7, a reactor shell 70 is embedded with super active catalyst particles 71 and rotates about four zones divided by partitions 72 and 73. The four zones are as follows: Reactor Zone I, in which reactant gases pass at conversion temperatures; Purge Zone II, in which a suitable seal medium, such as steam, passes; Regeneration Zone III, in which a suitable regeneration gas, such as heated air, passes; and Purge Zone IV, in which a seal medium passes. Thus, as the reactor shell 70 rotates, the super active catalyst passes through each zone. First the super active catalyst particles 71 pass through Reactor Zone I, wherein a reactant is converted in the presence thereof into more useful products; for example, a hydrocarbon charge stock may be cracked in the presence of rare earth exchanged crystalline X aluminosilicate. Next the catalyst particles 71 pass through Purge Zone II, wherein a seal medium, such as steam, purges the reaction gases from the catalyst. Third, the catalyst particles pass through Regeneration Zone III, wherein coke-like deposits are burned from the catalyst with an oxidizing regeneration gas, thereby reactivating the super active catalyst. Finally, the catalyst particles pass through Purge Zone IV, wherein a seal medium, such as steam, purges the catalyst of oxidizing gas, and pass into Reaction Zone I to start another cycle.

In FIGURE 8, there is shown an end view of a reactor comprising three horizontal zones and six vertically movable catalyst plates. Catalyst plates 80 are of a heat conductive material and have super active catalyst particles 81 embedded thereon. The plates 80 are retained in a vertical position by runners 82, provided with slots 83, and pass up and down through Reaction Zone I, Purge Zone II and Regeneration Zone III. Thus, in the operation of a catalytic cracking reactor, as illustrated by FIGURE 8, a hydrocarbon charge stock at conversion temperatures is passed through Reaction Zone I and contacts catalyst particles 81 embedded on plates 80 located in Zone I. The cracked products are taken from Zone I by means not shown. After a period of operation, the super active catalyst particles may require regeneration. Thus, by means not shown, the catalyst plates 80 are moved vertically downward through Purge Zone II into Regeneration Zone III. In Purge Zone II the hydrocarbon reactants and product are purged from the catalyst by a suitable seal gas such as steam. In Regeneration Zone III, coke-like deposits are burned from the catalyst particles, whereby the super active catalyst is reactivated. After regeneration, catalyst plates 80 are moved vertically upward again through Purge Zone II into Reaction Zone I to initiate another cycle. As shown in FIGURE 8, catalyst plates 80 in channels 1 and 6 are utilized in the reaction zone, while those in channels 3 and 4 are being regenerated and those in channels 2 and 5 are being purged by a seal medium.

Example

This example provides conditions under which catalytic cracking of a typical charge stock may be effected in various reactor systems employing the present method. Four reactor systems, A, B, C, and D, are provided by means of which 10,000 barrels per day of conventional cracking charge stock are cracked to 50 percent conversion. In each reactor crystalline aluminosilicate particles, characterized by an alpha ($\alpha$) of 1000, are embedded in the internal surfaces of reactor tubes.

Reactor dimensions and charge space velocity requirements are presented below:

| Case | A | B | C | D |
| --- | --- | --- | --- | --- |
| Number of Tubes | 1 | 10 | 10 | 10 |
| Tube Diameter, Ft. | 10 | 3.28 | 1.64 | 0.33 |
| Tube Length, Ft. | 410 | 90 | 130 | 460 |
| Total Cross Sectional Area of Tubes, Ft.$^2$ | 78 | 85 | 21 | 0.9 |
| LHSV, Vo/Hr-Vc | 170 | 240 | 325 | 453 |

It was found that due to complicated interaction of diffusion and chemical kinetics the reactor dimensions and space velocity relationships would vary considerably, yet effecting substantially equivalent results. Thus, for each of the above Cases, 10,000 barrels per day of charge stock are converted (50 percent conversion).

As hereinabove mentioned, the reactors of the present invention are characterized by space velocities far higher than that attainable in conventional fixed-, moving- or fluidized-bed reactors. Typical space velocities as utilized herein are about 20 to 50,000 liquid volumes per hour per volume of catalyst. Thus, at such space velocities, a super active catalyst, such as base-exchanged crystalline aluminosilicates, may be employed without sacrificing a substantial part of its high activity. Consequently, the present reactors find most beneficial employment in conversions over super active catalysts having activities of about 100 to 250,000 times those of conventional catalysts, and consequently, for the purpose of catalytic cracking and the like, such super active catalysts exhibit alpha ($\alpha$) values of between 100 and 250,000.

Super active crystalline aluminosilicate catalysts and processes employing super active catalysts are described, for example, in the following U.S. Patents: 3,140,249; 3,140,251; 3,140,252; and 3,140,253, incorporated herein by reference.

A preferred application of the present reactors is in vapor phase catalytic cracking. A highly active cracking catalyst, such as rare earth exchanged X or hydrogen exchanged Y faujasite may be utilized embedded on heat conductive surfaces. Extremely high space velocity and good heat transfer to and from the catalyst are made possible by the reactor design.

In reforming operations, heat may be applied to the heat transfer surfaces, thus obviating the need for multiple reactors with reheating between stages. A highly active reforming catalyst would be, for example, platinum-impregnated crystalline X aluminosilicate, which would be suitable in the present reactors.

Other applications for which the present reactors are especially well-suited include vapor phase hydrocracking over a catalyst generally comprising a cracking base and a hydrogenation component. The hydrocracking catalyst preferably is a super active crystalline aluminosilicate base exchanged or impregnated with a hydrogenation component. Suitable catalysts include offretite or faujasite base exchanged with nickel or cobalt ions, and cobalt-molybdena impregnated, rare earth or ammonium exchanged synthetic faujasite. High space velocity dehydrogenation of naphthas and kerosines may be effected over similar super active catalysts. Other fast vapor or liquid phase reactions, such as oxidation and the like may also take place in the present reactors.

In general, the present reactors find particular application in catalytic reaction over super active catalysts where high space velocities are required, especially if side reactions must be minimal or high heat transfer rates are desired.

Additional modifications and improvements utilizing the discoveries of the present invention can be readily anticipated by those skilled in the art and may fairly be presumed to be within the scope and purview of the invention as defined by the claims that follow.

I claim:

1. A process for catalytically converting hydrocarbons which comprises; contacting a hydrocarbon material at reaction temperature with crystalline aluminosilicate catalyst particles having an alpha ($\alpha$) activity above 100 at a liquid hourly space velocity from about 170 to about 50,000 whereby hydrocarbon products and coke are formed, said catalyst particles being embedded on a surface of at least one closed hollow member formed of a heat conductive metal, effecting heat transfer through said heat conductive metal to maintain reaction temperature during said contact, recovering said hydrocarbon products, purging hydrocarbons from contact with said catalyst particles, regenerating said catalyst particles at elevated temperature with a free-oxygen containing gas, regulating regeneration temperature by effecting heat transfer through said heat conductive metal, and purging free oxygen containing gas from contact with said catalyst particles.

2. The process of claim 1 wherein a plurality of closed hollow members are employed.

3. The process of claim 1 wherein said catalyst particles are embedded on both the inner and outer surfaces of said closed hollow member.

4. The process of claim 2 wherein said catalyst particles are embedded on both the inner and outer surfaces of said closed hollow members.

5. The process of claim 1 wherein said a aluminosilicate is base exchanged with at least one ion selected from the group consisting of rare earth metal, calcium, manganese, magnesium, hydrogen, hydrogen precursor ions and mixtures thereof.

6. The process of claim 1 wherein said aluminosilicate is a synthetic faujasite.

7. The process of claim 1 wherein said aluminosilicate contains a hydrogenation component.

8. The process of claim 1 wherein said aluminosilicate particles are embedded on the inner surface of said closed hollow member or members.

9. The process of claim 1 wherein said aluminosilicate particles are embedded on the outer surface of said closed member or members.

References Cited

UNITED STATES PATENTS

| | | | |
|---|---|---|---|
| 2,293,946 | 8/1942 | Payne | 208—120 |
| 2,387,454 | 10/1945 | Morisic | 208—120 |
| 2,634,232 | 4/1953 | Houdry | 208—120 |
| 3,173,854 | 3/1965 | Eastwood et al. | 208—111 |
| 3,254,022 | 5/1966 | Halik et al. | 208—120 |

ABRAHAM RIMENS, *Primary Examiner.*

DELBERT E. GANTZ, *Assistant Examiner.*